(12) United States Patent
Horio et al.

(10) Patent No.: US 8,477,591 B2
(45) Date of Patent: Jul. 2, 2013

(54) CONTROL APPARATUS, CONTROL METHOD AND COMPUTER PROGRAM OF COMMUNICATION SYSTEM

(75) Inventors: Daisuke Horio, Tokyo (JP); Hirohiko Inohiza, Yokohama (JP)

(73) Assignee: Canon Kabushiki Kaisha, Tokyo (JP)

(*) Notice: Subject to any disclaimer, the term of this patent is extended or adjusted under 35 U.S.C. 154(b) by 307 days.

(21) Appl. No.: 12/836,837

(22) Filed: Jul. 15, 2010

(65) Prior Publication Data
US 2011/0044315 A1 Feb. 24, 2011

(30) Foreign Application Priority Data
Aug. 19, 2009 (JP) .................. 2009-190400

(51) Int. Cl.
*H04J 7/00* (2006.01)
*H04J 1/00* (2006.01)
*H04B 7/208* (2006.01)

(52) U.S. Cl.
USPC ........................... 370/203; 370/344; 370/480

(58) Field of Classification Search .................. 370/203, 370/216, 228, 344, 480, 487
See application file for complete search history.

(56) References Cited

U.S. PATENT DOCUMENTS

| 6,909,753 | B2 | 6/2005 | Meehan et al. | |
|---|---|---|---|---|
| 7,324,431 | B2 * | 1/2008 | Lestable | 370/203 |
| 7,697,455 | B2 * | 4/2010 | Sadanada | 370/254 |
| 8,190,699 | B2 * | 5/2012 | McMillian et al. | 709/212 |
| 2005/0169183 | A1 * | 8/2005 | Lakkakorpi et al. | 370/238 |
| 2007/0091789 | A1 * | 4/2007 | Thukral | 370/216 |
| 2009/0252142 | A1 | 10/2009 | Horio | |

FOREIGN PATENT DOCUMENTS

| JP | 2002-204273 A | 7/2002 |
|---|---|---|
| JP | 2005-512418 A | 4/2005 |
| JP | 2009-49932 A | 3/2009 |
| WO | 03/049449 A2 | 6/2003 |
| WO | 2009/025181 A1 | 2/2009 |

OTHER PUBLICATIONS

WirelessHD Specification Version 1.0 Overview, pp. 1-77, Oct. 2007.

* cited by examiner

*Primary Examiner* — Paul H Masur
(74) *Attorney, Agent, or Firm* — Fitzpatrick, Cella, Harper & Scinto

(57) ABSTRACT

A control apparatus of a communication system that uses a plurality of communication paths from a transmission node to a reception node to redundantly transmit data is provided. The apparatus comprises: a setting unit for setting priorities to a plurality of partial data; a calculation unit for calculating the time slot number which is required to transmit the partial data on the communication paths; a selection unit for selecting one or more combinations of the partial data and the communication path. The selection unit selects the one or more combinations in descending order of the priorities of the partial data and selects the one or more combinations in ascending order of the required time slot number if the priorities of the partial data are equal.

9 Claims, 7 Drawing Sheets

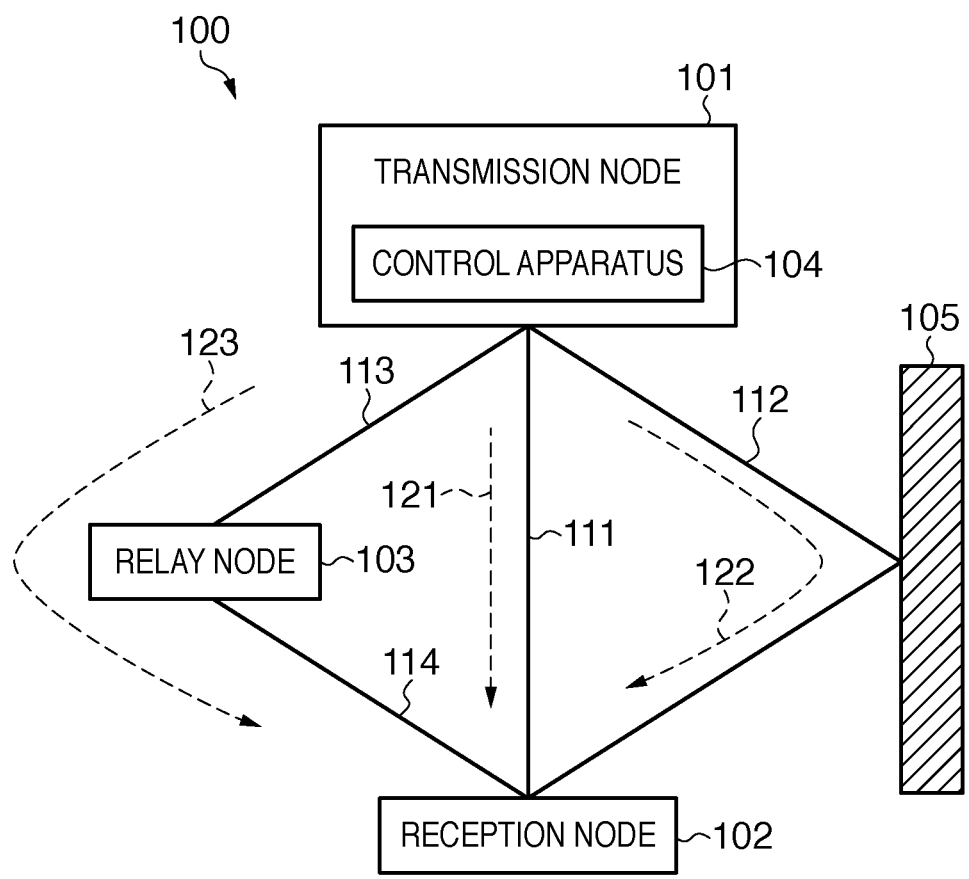
F I G. 1

F I G. 6

600 TOPOLOGY INFORMATION — 601

| COMMUNICATION LINK | SOURCE NODE | DESTINATION NODE | ANTENNA DIRECTION | LINK QUALITY |
|---|---|---|---|---|
| COMMUNICATION LINK A | TRANSMISSION NODE | RECEPTION NODE | PARTNER NODE | HIGH |
| COMMUNICATION LINK B | TRANSMISSION NODE | RECEPTION NODE | REFLECTIVE OBJECT | MEDIUM |
| COMMUNICATION LINK C | TRANSMISSION NODE | RELAY NODE | PARTNER NODE | HIGH |
| COMMUNICATION LINK D | RELAY NODE | RECEPTION NODE | PARTNER NODE | HIGH |

610 COMBINATION INFORMATION — 611

| PARTIAL DATA TYPE | COMMUNICATION PATH TYPE | THE NUMBER OF REQUIRED TIME SLOTS |
|---|---|---|
| PRIORITY DATA | DIRECT PATH (COMMUNICATION LINK A) | 1 |
| PRIORITY DATA | REFLECTION PATH (COMMUNICATION LINK B) | 2 |
| PRIORITY DATA | RELAY PATH (COMMUNICATION LINK C → COMMUNICATION LINK D) | 2 |
| NON-PRIORITY DATA | DIRECT PATH (COMMUNICATION LINK A) | 1 |
| NON-PRIORITY DATA | REFLECTION PATH (COMMUNICATION LINK B) | 2 |
| NON-PRIORITY DATA | RELAY PATH (COMMUNICATION LINK C → COMMUNICATION LINK D) | 2 |

620 ACCESS MANAGEMENT INFORMATION — 621

| TIME SLOT NUMBER | SOURCE NODE | COMMUNICATION LINK | MODULATION SCHEME | ENCODING RATE | PARTIAL DATA TYPE |
|---|---|---|---|---|---|
| 1 | TRANSMISSION NODE | COMMUNICATION LINK A | 16QAM | 3/4 | PRIORITY DATA |
| 2 | TRANSMISSION NODE | COMMUNICATION LINK A | 16QAM | 3/4 | NON-PRIORITY DATA |
| 3, 4 | TRANSMISSION NODE | COMMUNICATION LINK B | QPSK | 3/4 | PRIORITY DATA |
| 5, 6 | TRANSMISSION NODE | COMMUNICATION LINK B | QPSK | 3/4 | NON-PRIORITY DATA |
| 7 | TRANSMISSION NODE | COMMUNICATION LINK C | 16QAM | 3/4 | PRIORITY DATA |
| 8 | RELAY NODE | COMMUNICATION LINK D | 16QAM | 3/4 | PRIORITY DATA |

CONTROL APPARATUS, CONTROL METHOD AND COMPUTER PROGRAM OF COMMUNICATION SYSTEM

BACKGROUND OF THE INVENTION

1. Field of the Invention

The present invention relates to a control apparatus, a control method, and a computer program of a communication system.

2. Description of the Related Art

In recent years, a technique for realizing transmission of stream data including video signals and audio signals by wireless communication has been developed in a home theater, etc. The home theater includes a plurality of speakers, a display, associated communication terminals, and a control station for controlling the devices and requires a technique capable of playing back high-quality videos and music without interruptions and without fluctuations such as a transmission delay. When transmitting stream data from a video output apparatus to a video playback apparatus, it is difficult for a single communication path to prevent the effect of blocking by an obstacle. Consequently, a technique is proposed to use a plurality of communication paths to redundantly transmit the stream data. In Japanese Patent Laid-Open No. 2009-49932, each communication terminal uses a plurality of time slots to relay and transfer data transmitted from a control station every predetermined period (frame) to improve the reliability of the transmission data.

Furthermore, a technique for dividing the stream data into priority data and non-priority data to transmit the data is proposed. Japanese Patent Laid-Open No. 2002-204273 proposes a technique for transmitting the priority data by a modulation scheme with low modulation rate and transmitting the non-priority data by a modulation scheme with high modulation rate to improve the reliability of the priority data to prevent the user from feeling a degradation in the playback content. Japanese Patent Laid-Open No. 2005-512418 proposes a technique for transmitting the priority data at a high channel encoding rate and transmitting the non-priority data at a low channel encoding rate. In WirelessHD Specification. Version.1.0 Overview (website at wirelesshd.org in the sub-directory WirelessHD_Full_Overview_071009.pdf), proposed is a method of transmitting the priority data and the non-priority data at the same time without selectively using the modulation classes and then retransmitting only the priority data.

Although the reliability of data improves in the redundant transmission scheme in Japanese Patent Laid-Open No. 2009-49932, a large amount of communication band is used. Therefore, it is desired to improve the communication efficiency while maintaining the reliability of redundant transmission in a more suitable communication scheme.

The present invention provides a communication system capable of efficiently using a band to transfer data while keeping the redundancy of communication paths.

SUMMARY OF THE INVENTION

According to one aspect of the present invention, a control apparatus of a communication system that uses a plurality of communication paths from a transmission node to a reception node to redundantly transmit data is provided. The control apparatus comprises: an acquisition unit for acquiring transmission data transmitted by a communication frame; a setting unit for dividing the transmission data into a plurality of partial data and setting priorities to the plurality of partial data; a calculation unit for calculating the time slot number which is required to transmit the partial data on the communication path; a selection unit for selecting one or more combinations of the partial data and the communication path based on the priority of the partial data and the required time slot number; a determination unit for determining access management information defining the partial data to be transmitted in time slot of the communication frame and the communication path used in the transmission, based on the selected one or more combinations; and a notification unit for notifying node included in the communication system of the access management information, wherein the selection unit selects the one or more combinations in descending order of the priorities of the partial data and selects the one or more combinations in ascending order of the required time slot number if the priorities of the partial data are equal.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention, and together with the description, serve to explain the principles of the invention.

FIG. 1 is a diagram explaining an exemplary communication system 100 of a first embodiment.

FIG. 6 is a diagram explaining various exemplary information of the embodiment.

DESCRIPTION OF THE EMBODIMENTS

Figure 2:
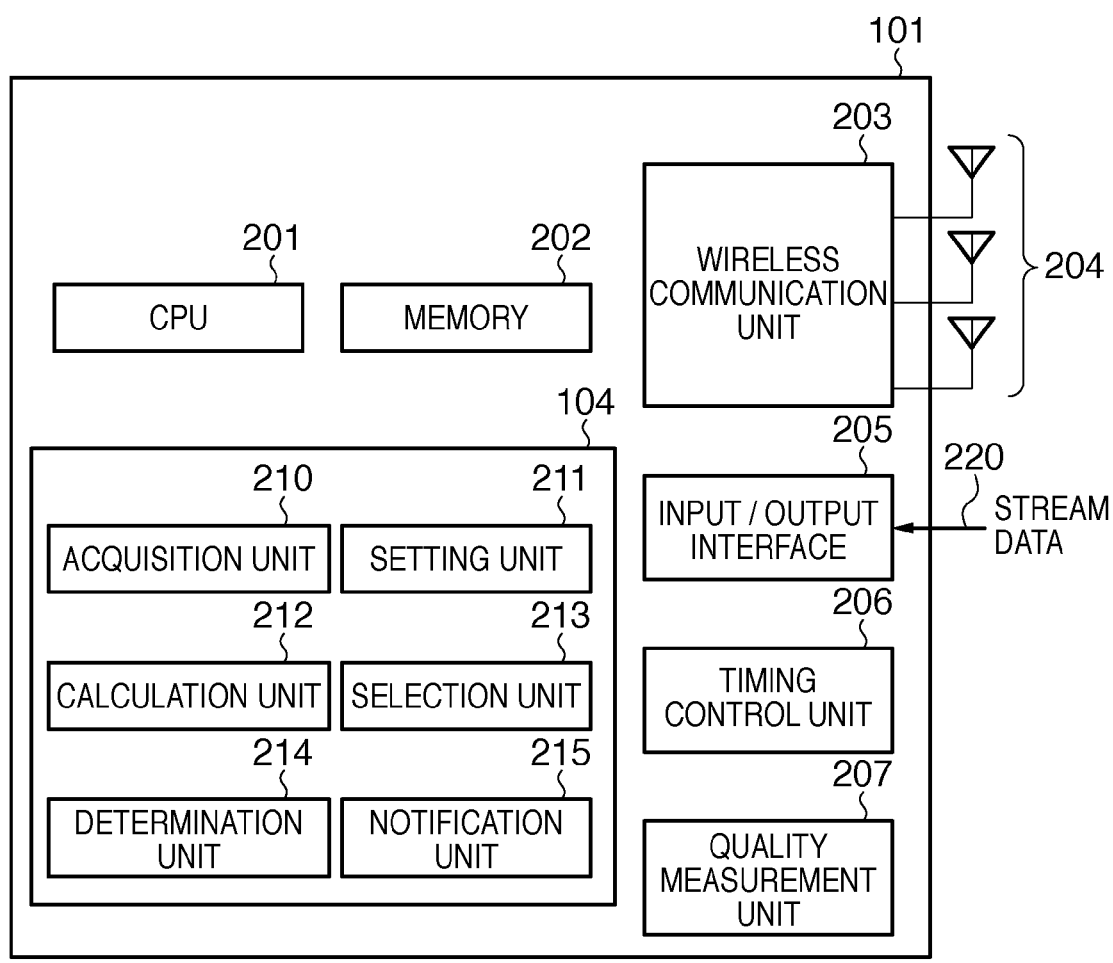
FIG. 2 is a diagram explaining an exemplary transmission node 101 of the embodiment.

Hereinafter, embodiments of the present invention will be described with reference to the attached drawings.

First Embodiment

[Configuration of Communication System 100]

An example of a configuration of a communication system 100 according to the present embodiment will be described with reference to FIG. 1. The communication system 100 includes a transmission node 101, a reception node 102, and a relay node 103. The transmission node 101 includes a control apparatus 104 that controls the communication system 100. Although the present embodiment handles a case where a control apparatus 104 is included in the transmission node 101, the control apparatus 104 may be included in another node in the communication system 100.

The nodes of the communication system 100 are connected by a communication link A 111, a communication link B 112, a communication link C 113, and a communication link D 114. The communication link A 111 directly connects the transmission node 101 and the reception node 102. The communication link B 112 uses a reflective object 105 to connect the transmission node 101 and the reception node 102. The communication link C 113 directly connects the transmission node 101 and the relay node 103. The communication link D 114 directly connects the relay node 103 and the reception node 102. Although the present embodiment handles a case in which the communication links are wireless connections, some or all of the communication links may be wired connections.

In the present embodiment, the transmission node 101 transmits stream data including control signals, video signals, and audio signals to the reception node 102. When transmitting the stream data, the transmission node 101 uses a plurality of communication paths toward the reception node 102 to redundantly transmit the same data. The transmission node 101 uses three communication paths, a direct path 121 using the communication link A 111, a reflection path 122 using the communication link B 112, and a relay path 123 using the communication link C 113 and the communication link D 114 to transmit data to the reception node 102. The number of communication paths is not limited to three. The number of communication paths may be any number equal to or greater than two. Each node can control the directivity of an antenna, and in the present embodiment, the transmission node 101 can use only one of the communication paths at one point to transmit data.

The transmission node 101 divides the stream data into frame-by-frame transmission data in accordance with a required data rate. The transmission node 101 then divides the transmission data of each frame into a plurality of partial data and transmits the data by time division scheme. The transmission node 101 provides priorities to the partial data. Although there is no limitation to the number of partial data, the present embodiment handles a case in which the partial data is divided into priority data provided with a high priority and non-priority data provided with a low priority for simplification of description. For example, MSB of the stream data is set as the priority data, and LSB is set as the non-priority data. Upon the transmission of data in each frame, the control apparatus 104 determines a combination of the type of partial data to be transmitted and the communication path used in the transmission for each of a plurality of time slots included in the frames. In each frame, the transmission node 101 redundantly transmits the priority data by a plurality of communication paths to satisfy designated redundancy. If there still is a free time slot of the frame after the transmission of the priority data satisfying the redundancy, the transmission node 101 redundantly transmits the non-priority data. The reception node 102 restores the stream data based on the received partial data.

In the transmission of stream data in the communication system 100 of the present embodiment, BPSK, QPSK, and 16QAM are used as primary modulation, and an OFDM communication scheme is used as secondary modulation. Assuming that the data multiplicity when BPSK is used as a modulation scheme is 1, the data multiplicity when QPSK is used is 2, and the data multiplicity when 16QAM is used is 4. Therefore, assuming that one time slot is necessary when certain data is transmitted by 16QAM, two times slots are necessary when QPSK is used, and four time slots are necessary when BPSK is used. However, as the data multiplicity increases, Eb/N0 as an energy per bit to noise power spectral density ratio also tends to increase. Therefore, the higher the data multiplicity in the modulation scheme, the higher is the quality required in the communication links. The quality required in the communication links includes, for example, a bit error rate.

In the present embodiment, it is assumed that the data sizes of the priority data and the non-priority data are the same and that the number of time slots necessary to transmit the priority data using 16QAM in each frame is one. It is assumed that each frame includes eight time slots.

[Block Diagram of Transmission Node 101]

An example of a block diagram of the transmission node 101 in the present embodiment will be described with reference to FIG. 2. The transmission node 101 includes a CPU 201, a memory 202, a wireless communication unit 203, an antenna 204, an input/output interface 205, a timing control unit 206, a quality measurement unit 207, and the control apparatus 104.

The CPU 201 manages the control of the entire transmission node 101. The memory 202 stores data, computer programs, various tables described below, etc. used in the transmission node 101. The wireless communication unit 203 modulates the data to be transmitted to a wireless signal and transmits the signal to the node of the destination through the antenna 204. The antenna 204 is an array antenna constituted by a plurality of antenna elements, and the antenna 204 can adjust the weight of the phase and the amplitude of the antenna elements to direct the directivity to a desired direction. The input/output interface 205 acquires stream data 220 inputted to the transmission node 101 from an external apparatus, such as a video output device, and writes the stream data 220 into the memory 202. The timing control unit 206 cooperates with other nodes included in the communication system 100 to synchronize timing of the time slots. The timing of the time slots denotes timing for each node in the communication system 100 to transmit data in each time slot. The quality measurement unit 207 cooperates with other nodes included in the communication system 100 to measure the quality of the communication links.

The control apparatus 104 includes an acquisition unit 210, a setting unit 211, a calculation unit 212, a selection unit 213, a determination unit 214, and a notification unit 215. Although the control apparatus 104 shares the CPU 201 and the memory 202 with the transmission node 101, the control apparatus 104 may include independent CPU and memory. The acquisition unit 210 reads out the stream data 220 written into the memory 202. Alternatively, the acquisition unit 210 may directly acquire the stream data 220 from the input/output interface 205. The setting unit 211 divides the stream data 220 into data to be transmitted in each frame based on the data rate. The setting unit 211 further divides the data to be transmitted in each frame into two or more partial data. The setting unit 211 sets priorities to the partial data. As described, in the present embodiment, the data to be transmitted in each frame is divided into priority data and non-priority data which serve as partial data. The setting unit 211 writes back the priority data and the non-priority data into the memory 202. The calculation unit 212 calculates the number of time slots necessary when the priority data and the non-priority data are transmitted through the communication paths. Hereinafter, the number of necessary time slots will be called the number of required time slots. To calculate the number of required time slots, the calculation unit 212 refers to the quality of the communication links and determines the modulation classes used in the communication links. The modulation class includes a modulation scheme and a channel encoding rate. The selection unit 213 allocates a time slot to each combination of the type of the partial data to be transmitted and the communication path to be used in the transmission. The determination unit 214 determines the partial data to be transmitted in each time slot and the communication path to be used in the transmission based on the combination selected by the selection unit 213. The determination unit 214 writes the determined content into the memory 202 as access management information. Details of the access management information will be described below. The notification unit 215 notifies the other nodes included in the communication system 100 of the access management information through the wireless communication unit 203.

[Block Diagram of Reception Node 102]

Figure 3:
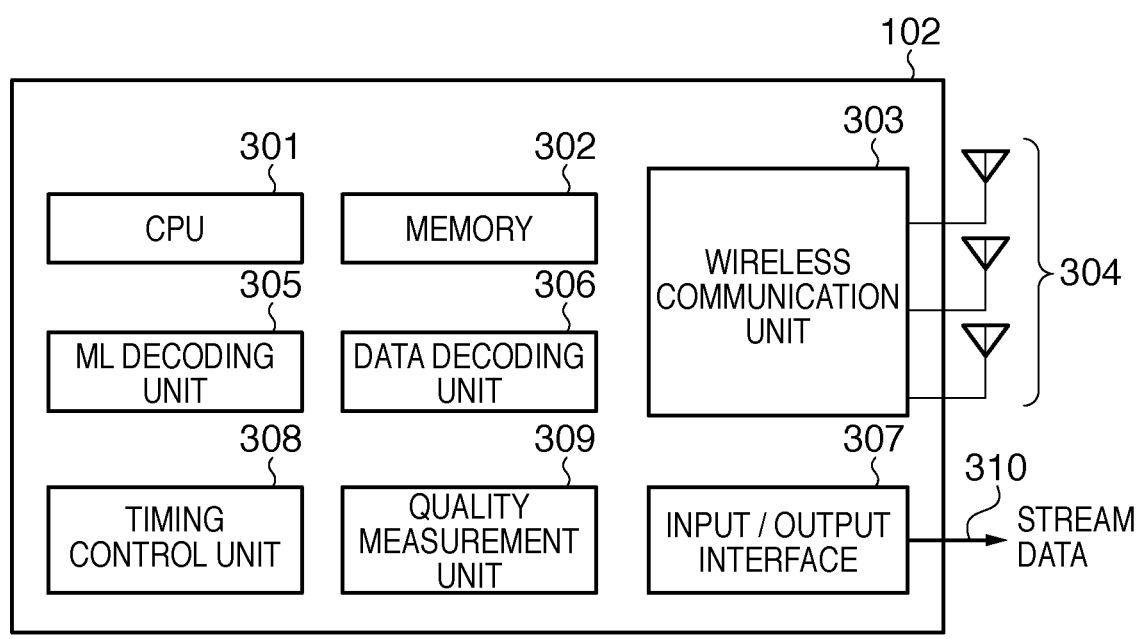
FIG. 3 is a diagram explaining an exemplary reception node of the embodiment.

A block diagram of the reception node 102 in the present embodiment will be described with reference to FIG. 3. The reception node 102 comprises a CPU 301, a memory 302, a wireless communication unit 303, an antenna 304, an ML (Maximum Likelihood) decoding unit 305, a data decoding unit 306, an input/output interface 307, a timing control unit 308, and a quality measurement unit 309.

The CPU 301 manages the control of the entire reception node 102. The memory 302 stores data, computer programs, etc. used in the reception node 102. The wireless communication unit 303 demodulates a wireless signal received through the antenna 304 to partial data and writes the data into the memory 302. The antenna 304 is an array antenna constituted by a plurality of antenna elements, and the antenna 304 can adjust the weight of the phase and the amplitude of each antenna element to direct the directivity to a desired direction. The ML decoding unit 305 reads out the partial data received through a plurality of communication paths from the memory 302 and applies ML decoding to each partial data. The ML decoding is performed by selecting most reliable data from a plurality of the same type of partial data received from the plurality of communication paths or by determining by majority. The reception node 102 may comprise the ML decoding unit 305 for each type of partial data. The data decoding unit 306 connects the ML-decoded partial data to decode the stream data 310 of each frame. The input/output interface 307 outputs the stream data 310 to an external apparatus, such as a video playback device. The timing control unit 308 cooperates with other nodes included in the communication system 100 to synchronize timing of the time slots. The quality measurement unit 309 cooperates with other nodes included in the communication system 100 to measure the quality of the communication links.

Although the relay node 103 comprises a CPU, a memory, a wireless communication unit, an antenna, a timing control unit, and a quality measurement unit, the functions of the elements are the same as those of the elements included in the transmission node 101 and the reception node 102. Therefore, the description will not be repeated.

[Operation of Communication System 100]

An example of an operation of the communication system 100 will be described with reference to FIGS. 4 to 6. The CPU of each node executes computer programs written in the memory to process a flow chart shown in FIG. 4.

In S401a to S401c, each node carries out training in accordance with an instruction from the control apparatus 104. The training is a set of actions performed by each node in the communication system 100 in order to detect communication links and generate information, such as antenna direction, necessary in communication to transmit and receive data between the communication links, and to share the information between all nodes. The information shared by all nodes will be called topology information 600.

An example of the topology information 600 will be described with reference to FIG. 6. In the topology information 600, communication link 601, source node 602, destination node 603, antenna direction 604, and link quality 605 are associated and stored. The communication link 601 in the communication system 100 is detected as a result of the training. For simplification, only the communication links A 111 to D 114 necessary for explanation are described in the topology information 600. The communication link 601 is directed, and the source node 602 that transmits the data and the destination node 603 that receives the data are associated. The antenna direction 604 denotes the direction of the directivity of the antennas of both nodes when the data is transmitted and received in the communication link 601. For example, data is directly transmitted and received in the case of the communication link A 111. Therefore, the transmission node 101 and the reception node 102 direct the antennas to partner nodes. Data is transmitted and received through the reflective object 105 in the case of the communication link B 112. Therefore, the transmission node 101 and the reception node 102 direct the antennas to the reflective object 105. The link quality 605 denotes the quality of the communication link 601. The link quality 605 is measured by the quality measurement unit of each node and is classified into three levels, "high", "medium", and "low", in the present embodiment. For example, the quality measurement units 207 and 309 use at least one of the signal intensity, the bit error rate, and the frame error rate of the reception data to make determinations.

In S402, the acquisition unit 210 acquires the stream data 220. For example, the acquisition unit 210 acquires the stream data 220 of each frame. The acquisition unit 210 may further acquire redundancy of the communication path from the user or from the application that has generated the stream data 220. The redundancy of the communication path denotes the expected number of communication paths in the transmission of the stream data 220. For example, if the redundancy of the communication path is 3, the stream data 220 is expected to be transmitted using three different types of communication paths.

In S403, the setting unit 211 divides the stream data 220 to generate partial data and sets a priority to each partial data. As described, the setting unit 211 generates two types of partial data in the present embodiment, sets a high priority to one partial data, and sets a low priority to the other. The partial data with the high priority will be called priority data, and the partial data with the low priority will be called non-priority data. The setting unit 211 may generate two or more types of partial data and may set the same priority to different types of partial data.

In S404, the calculation unit 212 determines candidates of the communication path. The calculation unit 212 determines the communication path from the transmission node 101 to the reception node 102 based on the communication link 601 of the topology information 600 created in S401. As described, three communication paths, the direct path 121, the reflection path 122, and the relay path 123 are determined as the candidates. The calculation unit 212 may filter the communication path based on the upper limit of the number of nodes to be passed through or based on the lower limit of the link quality.

In S405, the calculation unit 212 determines the modulation class used in each communication path based on the link quality 605. As described, the modulation class includes at least one of the modulation scheme and the channel encoding rate. It is assumed that the communication link 601 with "high", "medium", and "low" link quality 605 is used to transmit and receive data by 16QAM, QPSK, and BPSK, respectively. The channel encoding rate may also be set based on the link quality 605.

In S406, the calculation unit 212 calculates the number of required time slots for each combination of the type of partial data and the type of communication path. Hereinafter, the combination of the type of partial data and the type of communication path will be simply called a combination. The calculation unit 212 first lists all combinations as combination information 610 shown in FIG. 6. In the combination information 610, partial data type 611 denotes types of partial data, communication path type 612 denotes types of communication paths, and the number of required time slots 613 denotes the numbers of time slots required in the combinations. There are two types of partial data and three types of communication paths. Therefore, the combination information 610 includes six entries. The calculation unit 212 then calculates the number of required time slots 613 for each combination. For example, when the direct path 121 is used to transmit priority data, the data is transmitted by 16QAM since the link quality 605 of the communication link A 111 is "high". Therefore, the number of required time slots 613 of the combination is 1. In another example, when the relay path 123 is used to transmit non-priority data, one time slot is necessary for the communication link C 113, and one time slot is necessary for the communication link D 114. Therefore, the number of required time slots 613 is 2.

In S407, the selection unit 213 selects partial data transmitted in one frame and a communication path used in the transmission based on the priority of the partial data and the number of required time slots 613 of the communication path. Details of S407 will be described below.

In S408, the determination unit 214 generates access management information 620 based on the selected combination. The access management information 620 denotes information related to data transmitted in each time slot in a frame (for example, Super frame) as shown in FIG. 6. Time slot number 621 denotes a time-series order of the time slots in the frame. As described, one frame includes eight time slots in the present embodiment. Source node 622 denotes nodes for transmitting data in the time slots, and communication link 623 denotes communication links used in the transmission of data. If the source node 622 and the communication link 623 are determined, the destination node is also determined with reference to the topology information 600. Modulation scheme 624 and encoding rate 625 denote the modulation scheme and the channel encoding rate used in the transmission of data in each time slot respectively. Partial data type 626 denotes the type of partial data transmitted in each time slot.

In S409a to S409c, the notification unit 215 notifies each node of the access management information 620, and each node receives the access management information 620. In S410a to S410c, each node transmits and receives partial data based on the access management information 620. For example, in the first time slot, the transmission node 101 transmits the priority data to the reception node 102 through the communication link A 111. In the transmission, 16QAM is used as the modulation scheme, and the channel encoding rate is set to ¾. Since the communication link A 111 is used, the transmission node 101 and the reception node 102 direct the antennas to the directions of nodes before the transmission in accordance with the antenna direction 604 of the topology information 600. The reception node 102 demodulates the received partial data based on the modulation scheme 624 and the encoding rate 625 of the access management information 620 and writes the data into the memory 302.

In S411, the reception node 102 restores the stream data 310 from the received partial data. According to the access management information 620, the reception node 102 will receive three priority data and two non-priority data. Therefore, the ML decoding unit 305 applies ML decoding to the priority data and the non-priority data and selects one piece of priority data and one piece of non-priority data. The data decoding unit 306 then connects the priority data and the non-priority data to restore the stream data 310.

Details of S407 will be described with reference to FIG. 5. In S501, the selection unit 213 selects a combination from the combination information 610. In the selection, a combination including partial data with high priority is prioritized firstly, and a combination with fewer number of required time slots is prioritized secondly. In other words, among the combinations including partial data with high priority, a combination with the smallest number of required time slots is selected. In the present embodiment, a combination of transmitting priority data by the direct path 121 is selected.

The selection unit 213 may select either one of the combinations with the same priority and the same number of required time slots. For example, the selection unit 213 may select a combination with fewer relay nodes 103 to be passed through among the combinations. This can reduce the risk of transmission error due to a malfunction of the relay nodes 103. The selection unit 213 may also select a combination including a communication path with higher quality among the combinations. The quality of the communication path is defined by the link quality 605 of communication link included in the communication path. If a plurality of communication links are included as in the relay path 123, the lowest link quality 605 serves as the quality of the communication path. As the quality of the communication path is taken into consideration, the time slots can be more appropriately allocated.

In S502, the selection unit 213 determines whether the number of allocated time slots exceeds the number of allowable time slots when the time slots are allocated to the selected combination. The number of allowable time slots, which is eight in the present embodiment, denotes the number of time slots that can be used in the transmission of data in one frame. If the number exceeds ("YES" in S502), the process ends. If the number does not exceed ("NO" in S502), the process moves to S503.

In step S503, the selection unit 213 allocates the time slots to the selected combination. In the combination provided with the time slots, data is transmitted in one of the time slots of the frame. The selection unit 213 deletes the combination provided with the time slots from the combination information 610. This prevents the combination provided with the time slots from being selected again in S501. The selection unit 213 may change the priority of the combination provided with the time slots to the lowest value to prevent the combination from being selected again. In that case, the original priority can be temporarily saved.

In S402, if the acquisition unit 210 has acquired the redundancy of the communication path and if the selected combination including the same type of partial data has reached the redundancy, the selection unit 213 deletes the combination including that type of partial data from the combination information 610. This prevents allocation of time slots to the communication paths exceeding the designated redundancy in the partial data, and more types of partial data are transmitted.

In S504, the selection unit 213 determines whether there is a combination not selected yet. If there is a combination ("YES" in S504), the process returns to S501, and a combination is further selected. If there is no combination ("NO" in S504), the process ends. Upon the completion of the process, the selection unit 213 may, for example, restore the saved original value when the priority is changed.

According to the present embodiment, an optimal allocation of time slots is possible in consideration of the communication link quality while securing the redundancy of the communication paths.

Second Embodiment

The first embodiment has handled a case that the directivity of an antenna including nodes is narrow directivity and that the number of communication paths that can be used at one point is one. The present embodiment handles a case in which the antenna is wide-directivity and that a plurality of communication paths can be used at one point. In this case, transmission of partial data by a first communication path may allow skipping transmission of the partial data by at least part of a second communication path. The description of the parts overlapping the first embodiment will not be repeated, and the parts specific to the present embodiment will be described.

Figure 7:
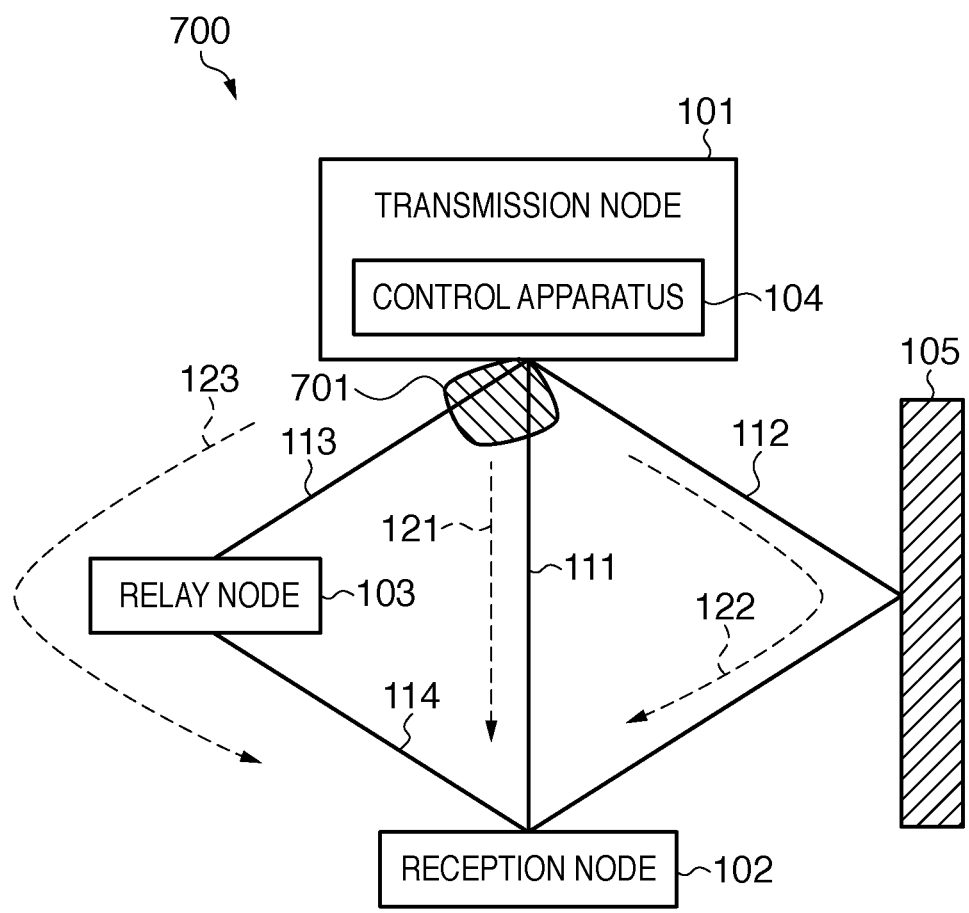
FIG. 7 is a diagram explaining an exemplary communication system 700 of a second embodiment.

FIG. 7 shows an example of a communication system 700 according to the present embodiment. The transmission node 101 can control the weight of the antenna elements of the antenna 204 to set the directivity to wide directivity to simultaneously transmit the data in directions shown in an area 701. As a result, the transmission node 101 can transmit data to the communication link A 111 and the communication link C 113 at the same time. As a result, for example, if the direct path 121 is used to transmit the priority data from the transmission node 101 to the reception node 102 at a certain time slot, there is no need to transmit the priority data from the transmission node 101 to the relay node 103 in the following time slots.

Figure 5:
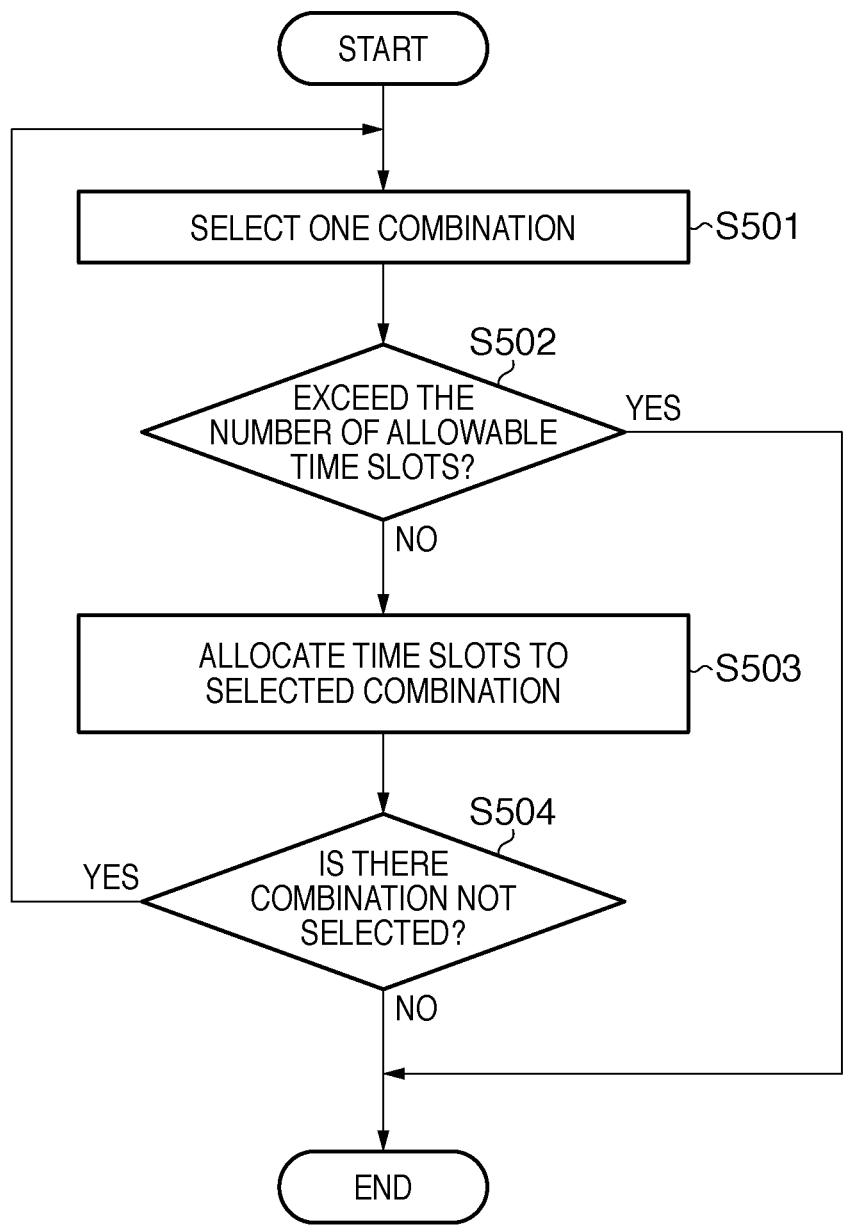
FIG. 5 is a diagram explaining an exemplary operation of the communication system 100 of the embodiment.

Therefore, in S503 shown in FIG. 5, if a combination of transmitting the priority data using the direct path 121 is selected, the selection unit 213 subtracts the number of required time slots 613 of the combination for transmitting the priority data using the relay path 123. The value to be subtracted is the number of time slots in which the transmission is skipped. More specifically, the value is the number of time slots required to transmit the priority data using the communication link C 113.

Figure 4:
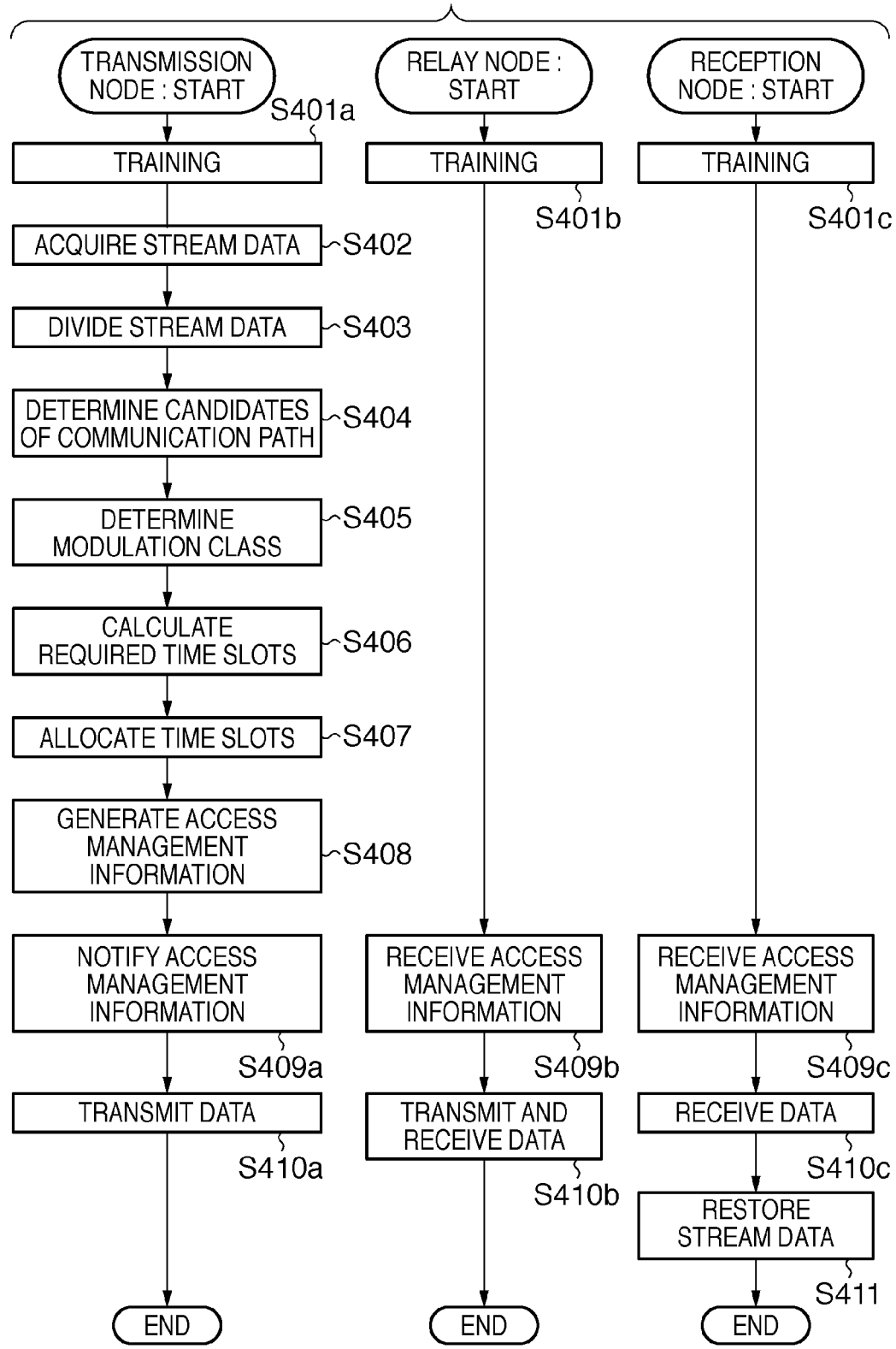
FIG. 4 is a diagram explaining an exemplary operation of the communication system 100 of the embodiment.

When transmission of part of the partial data is skipped, the determination unit 214 takes the skip into consideration to create the access management information 620 in S408 shown in FIG. 4. In that case, the determination unit 214 defines the order of the time slots to transmit the priority data using the relay path 123 after the transmission of the priority data using the direct path 121.

According to the present embodiment, the present invention can be applied even if the antenna includes wide directivity.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-190400, filed Aug. 19, 2009, which is hereby incorporated by reference herein in its entirety.

What is claimed is:

1. A control apparatus of a communication system that uses a plurality of communication paths from a transmission node to a reception node to redundantly transmit data, the control apparatus comprising:

an acquisition unit constructed to acquire transmission data transmitted by a communication frame;

a setting unit constructed to divide the transmission data into a plurality of partial data and to set priorities to the plurality of partial data;

a calculation unit constructed to calculate a time slot number which is required to transmit the partial data on the communication paths;

a selection unit constructed to select one or more combinations of the partial data and the communication paths based on the priority of the partial data and the required time slot number;

a determination unit constructed to determine access management information defining the partial data to be transmitted in a time slot of the communication frame and at least one of the communication paths used in the transmission, based on the selected one or more combinations; and a notification unit constructed to notify nodes included in the communication system of the access management information, wherein the selection unit selects the one or more combinations in descending order of the priorities of the partial data and selects the one or more combinations in ascending order of the required time slot number if the priorities of the partial data are equal, wherein each of the acquisition unit, the setting unit, the calculation unit, the selection unit, the determination unit, and the notification unit is implemented by using one or more processors, and wherein the one or more processors is coupled to a memory.

2. The apparatus according to claim 1, wherein
the acquisition unit further acquires redundancy of the communication paths required to transmit the transmission data, and
the selection unit does not select the combinations including the partial data any more if the number of combinations including the same partial data reaches the redundancy.

3. The apparatus according to claim 1, wherein
the selection unit terminates selecting the one or more combinations if the total number of required time slots exceeds the number of time slots of the frame when the combinations are further selected.

4. The apparatus according to claim 1, wherein
the calculation unit calculates the required time slot number based on a modulation class, the modulation class including at least one of a modulation scheme and a channel encoding rate used in the communication paths.

5. The apparatus according to claim 4, wherein
the calculation unit determines the modulation class based on a quality of at least one of the communication paths, the quality including at least one of a signal intensity, a bit error rate, and a frame error rate of data received by each node of the communication system.

6. The apparatus according to claim 5, wherein
the selection unit selects the one or more combinations in descending order of the communication link quality if the priorities of the partial data are equal and the numbers of required time slots are equal.

7. The apparatus according to claim 1, wherein
if transmission of the partial data in at least part of a second communication path can be skipped as a result of transmission of the partial data in a first communication path and if the selection unit selects the combination of the first communication path and the partial data,
the selection unit subtracts the number of time slots required to transmit the partial data using at least the part from the number of required time slots in the transmission of the partial data using the second communication path.

8. A non-transitory computer-readable storage medium on which is stored a computer program for causing a computer to function as the control apparatus according to claim 1.

9. A control method of a communication system for using a plurality of communication paths from a transmission node to a reception node to redundantly transmit data, the control method comprising the steps of:

acquiring transmission data transmitted by a communication frame;

dividing the transmission data into a plurality of partial data and setting priorities to the plurality of partial data;

calculating a time slot number which is required to transmit the partial data;

selecting one or more combinations of the partial data and the communication paths based on the priority of the partial data and the required time slot number;

determining access management information defining the partial data to be transmitted in a time slot of the communication frame and at least one of the communication paths used in the transmission, based on the selected one or more combinations; and notifying nodes included in the communication system of the access management information, wherein in the selecting, the one or more combinations are selected in descending order of the priorities of the partial data and the one or more combinations are selected in ascending order of the required time slot number if the priorities of the partial data are equal.

* * * * *